United States Patent [19]

Pas

[11] Patent Number: 5,431,854

[45] Date of Patent: Jul. 11, 1995

[54] METHOD FOR PRESSING A PLASTIC, WHICH CURES BY MEANS OF A REACTION, INTO A MOULD CAVITY, A PRESSING AUXILIARY IN PILL FORM TO BE USED IN THIS METHOD AND A HOLDER COMPOSED OF SUCH MATERIAL

[75] Inventor: Ireneus J. T. M. Pas, Rozendaal, Netherlands

[73] Assignee: "3P" Licensing B.V., Rozendaal, Netherlands

[21] Appl. No.: 256,681

[22] PCT Filed: Jan. 22, 1993

[86] PCT No.: PCT/NL93/00024

§ 371 Date: Jul. 20, 1994

§ 102(e) Date: Jul. 20, 1994

[87] PCT Pub. No.: WO93/14920

PCT Pub. Date: Aug. 5, 1993

[30] Foreign Application Priority Data

Jan. 23, 1992 [NL] Netherlands ............... 9200127

[51] Int. Cl.⁶ .................... B29C 45/46; B29C 45/02
[52] U.S. Cl. ................. 264/328.5; 264/328.9; 425/544; 425/DIG. 228
[58] Field of Search ........... 264/570, 328.1, 328.2, 264/328.4, 328.5, 328.8, 328.9; 425/543, 544, DIG. 228

[56] References Cited

U.S. PATENT DOCUMENTS

| | | | |
|---|---|---|---|
| 3,483,287 | 12/1969 | Davis | 264/328.5 |
| 3,870,449 | 3/1975 | Stringfellow | 425/DIG. 228 |
| 3,911,075 | 10/1975 | Boesch et al. | 264/328.5 |
| 5,043,199 | 8/1991 | Kubota et al. | 264/328.5 |

FOREIGN PATENT DOCUMENTS

| | | |
|---|---|---|
| 1812217 | 8/1969 | Germany . |
| 56100429 | 8/1981 | Japan . |
| 56107559 | 8/1981 | Japan . |
| 57015427 | 1/1982 | Japan . |
| 59151436 | 8/1984 | Japan . |
| 3157942 | 7/1991 | Japan . |

*Primary Examiner*—Jill L. Heitbrink
*Attorney, Agent, or Firm*—Edmund M. Jaskiewicz

[57] ABSTRACT

Method for pressing a plastic (6), which cures by means of a reaction, from a displacement chamber (4) via at least one injection channel (3) and a gate (2) to a mould cavity (1), said method at least comprising the following steps: pressurising the plastic (6) with an amount of a pressing auxiliary (7) in the displacement chamber (4); pressing the plastic (6) into the mould cavity (1); and allowing the plastic to cure under pressure in the mould cavity, the pressing auxiliary (7) being plastically deformable under the conditions of pressing and the amount thereof being sufficient to be pressed to the vicinity of the gate (2) of the mould cavity (1). Preferably the pressing auxiliary (7) is a thermoplastic.

7 Claims, 3 Drawing Sheets

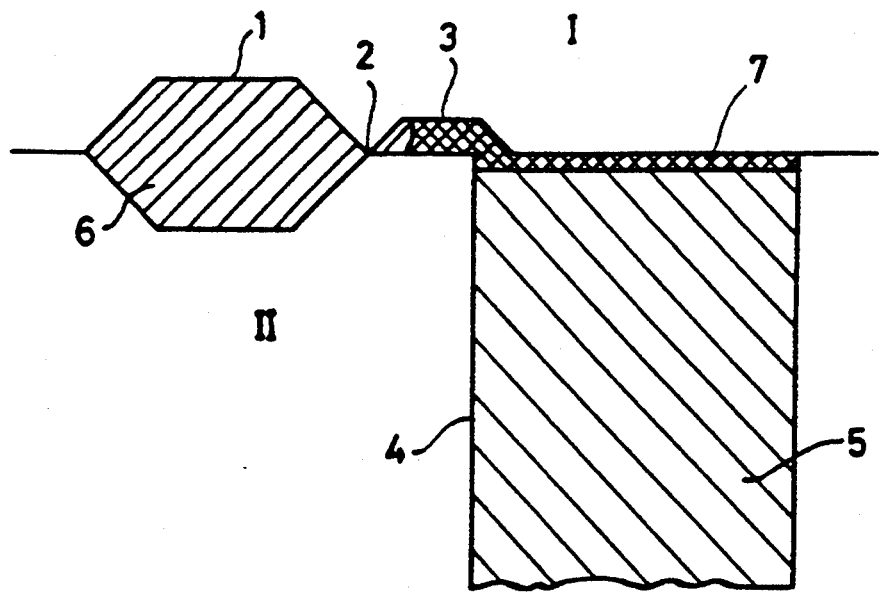
FIG:1c.
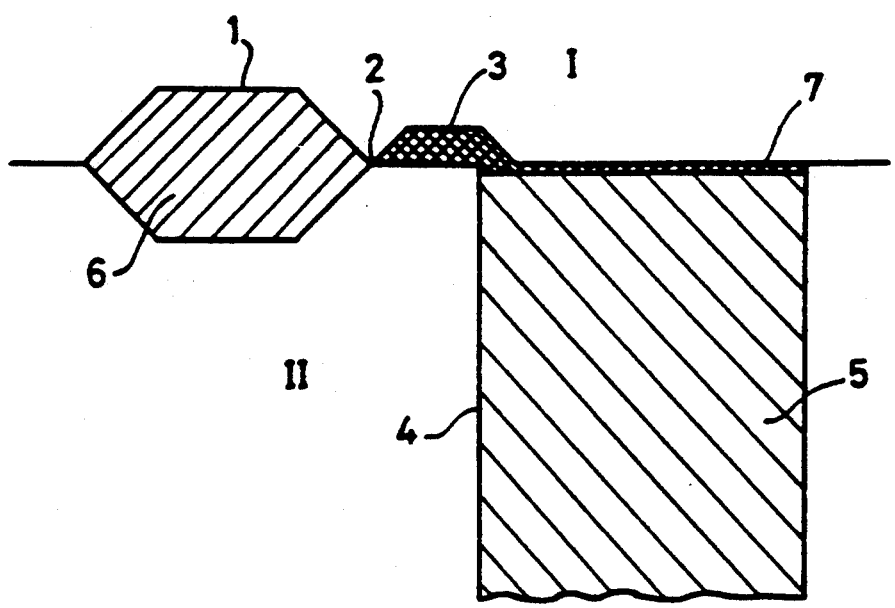
FIG:1d.

METHOD FOR PRESSING A PLASTIC, WHICH CURES BY MEANS OF A REACTION, INTO A MOULD CAVITY, A PRESSING AUXILIARY IN PILL FORM TO BE USED IN THIS METHOD AND A HOLDER COMPOSED OF SUCH MATERIAL

The present invention firstly relates to a method for pressing a plastic, which cures by means of a reaction, from a displacement chamber via at least one injection channel and a gate into a mould cavity, said method at least comprising the following steps:
 pressurising the plastic with an amount of a pressing auxiliary in the displacement chamber;
 pressing the plastic into the mould cavity; and
 allowing the plastic to cure under pressure in the mould cavity,
the amount of pressure auxiliary being sufficient to be pressed to the vicinity of the gate of the mould cavity.

The term plastic which cures by means of a reaction is used to designate plastics such as, for example, thermosetting plastics and photopolymerisable plastics, multicomponent plastics and the like. These are plastics which cure by supplying heat or light or after mixing with a chemical compound. Examples of such plastics are generally known to those skilled in the art. The plastics which cure by means of moisture or air can also be mentioned in this context. Usually however thermosetting plastics are used.

The abovementioned method is generally known and is used for the production of diverse mouldings from plastics which cure by means of a reaction. The encapsulation of integrated circuits in thermosetting plastics, and the production of car components from such plastics, can, for example, be considered in this context.

In this respect reference is made to U.S. Pat. No. 3,911,075. In said specification a method is described, in which method a first thermosetting polymeric material is used as the plastic which cures by means of a reaction. Further a cheap second thermosetting polymeric material is used as the pressing auxiliary. By pressing the two polymeric materials together from a displacement chamber, through an injection channel and a gate into a mould cavity, the passages up to the gate are filled with the relatively cheap thermosetting polymeric material.

Pressing of plastics which cure by means of a reaction into a mould cavity is, as a consequence of the properties of these plastics, usually a batchwise method, because the curing reaction is frequently exothermic and is a reaction which goes to completion. For example, thermosetting plastics are plastics which melt by supplying heat thereto and then cure by means of an exothermic reaction. As a consequence thereof, thermosetting plastics have a relatively short storage time and must also be stored cool. Comparable storage problems arise in the case of plastics which cure by means of light, air or moisture. Although multicomponent plastics, which cure by mixing the various components with one another, have fewer storage problems, the curing reaction usually goes to completion after mixing.

Plastics which cure by means of a reaction are usually placed in a determined amount, for example in pill form, together with a, e.g. thermosetting, pressing auxiliary, in a displacement chamber which is connected via injection channels to the gates of the mould cavities. The plastic and pressing auxiliary are then pressed with the aid of a plunger or the like through the injection channels and the gates into the mould cavities. With this method it can be advantageous, for example in the case of thermosetting plastics, to heat the plunger or the displacement chamber. The plastic itself can also be preheated.

Once the mould cavities have been filled with the plastic, said cavities must be kept under pressure during curing of the plastic, in order to prevent bubble formation as a result of any entrapped air or moisture which may be present. This is done by pressurising the pressing auxiliary.

By using a pressing auxiliary a number of significant disadvantages of using only the plastic which cures by a reaction are overcome. A relatively large amount of cured plastic, which remained behind in said channels and in the displacement chamber after curing, is saved.

The materials used as pressing auxiliaries are in the state of the art limited to thermosetting plastics (e.g. U.S. Pat No. 3,911,075). These plastics have proven to be quite useful although they still possess a number of important disadvantages. Thermosetting materials usually have an exceptionally good adhesive strength to the mould (mould cavity, the injection channels and the displacement chamber) after curing thereof. To date, in order to lower this adhesive strength, release agents, such as release wax and the like are added to the plastic, which additives are not advantageous if an article, such as, for example, an integrated circuit, has to be coated with the plastic, as the release agent will inherently deteriorate the adhesion to said integrated circuit.

Thermosetting plastics will always react to completion and are therefore not re-usable, which is a problem as a consequence of the fact that they are rather expensive and environmentally unfriendly plastics.

Further it is difficult to prevent mixing when using a pressing auxiliary consisting of thermosetting plastic during the filling of a mould cavity with another thermosetting plastic. Thermosetting plastics completely melt with relatively small viscosity differences, before curing.

The object of the present invention is to provide a solution for the abovementioned disadvantages and to this end it is characterised in that as the pressing auxiliary a material is used which is plastically deformable under the conditions of pressing and reversibly coagulates or hardens after pressing.

Surprisingly, it has been found possible, while pressing two different materials at the same time, nevertheless completely to fill the mould cavity with the plastic which cures by means of a reaction and to fill the remaining space, that is to say the remaining space in the displacement chamber and the injection channels, essentially to the vicinity of the gate, with the pressing auxiliary, essentially no mixing taking place. Further the method according to the invention has the advantage that the pressing auxiliary is re-usable and can be chosen from environmentally friendly materials.

Preferably under the conditions of pressing, the pressing auxiliary has a higher viscosity than the plastic which cures by means of a reaction.

Advantageously, the pressing auxiliary is a thermoplastic. Suitable thermoplastics are, for example, polyesters, polyethylene, polypropylene etc. The advantage of thermoplastics is that these can be re-used and that these, moreover, have a relatively low adhesive strength to the mould (mould cavity, injection channel, etc.). Moreover, it would be possible to add release agents thereto, since the addition of release agents to the pressing auxiliary has no influence on the moulding to be produced. Thermoplastics are reversibly softened by a temperature rise.

The pressing auxiliary according to the invention can be pressed in the displacement chamber in a very large number of different ways, depending on the plastic which cures by means of a reaction which is used and the form in which it is used. If, for example, a plastic in pill form is used, it is preferred also to press the pressing auxiliary in pill form in the displacement chamber with the thermosetting plastic.

However, it has also been found to be possible to place a plastic, which cures by means of a reaction, in a holder beforehand and optionally under vacuum. In this case it is advantageous to produce the holder from the pressing auxiliary according to the invention, which holder can be processed after filling with the plastic. The holder may locally be provided with thickened sections, if necessary, in order to be able to provide the required amount of pressing auxiliary which is needed to fill the volume between the mould cavity and the displacement chamber. Of course, it is also possible to introduce the pressing auxiliary in pill form into the displacement chamber alongside the holder, or to incorporate supplementary pressing auxiliary in the holder alongside the plastic which cures by means of a reaction.

Reference is made to DE-A-1 812 217 which describes a method for injection moulding of hardenable liquid masses for form-press and encapsulation applications. The problem for which a solution is provided resides in the fact that the filling of the hardenable liquids in the displacement chamber substantially reduces the speed of the injection moulding method, and that the risk exists of hardening of the liquid already in the displacement chamber or the injection channels prior to complete filling of the mould cavity. The solution is to use a package containing the liquid mass. Said package may be produced from aluminium foil or Mylar-Polyester foil. The use of a pressing auxiliary is however not disclosed.

The invention further provides a pressing auxiliary in pill form, made of a material which is plastically deformable under conditions of pressing and reversibly coagulates or hardens after pressing, for use in the method according to the invention.

Finally, the invention provides a holder made of a material which is plastically deformable under conditions of pressing and reversibly coagulates or hardens after pressing, filled with or obviously intended to be filled with a plastic which cures by means of a reaction, for use in the method according to the invention.

The invention will be illustrated in more detail below with reference to the appended drawing, in which:

FIGS. 1a–d show a diagrammatic representation of various sub-steps Of an illustrative embodiment of the method according to the invention;

Figure 1A:
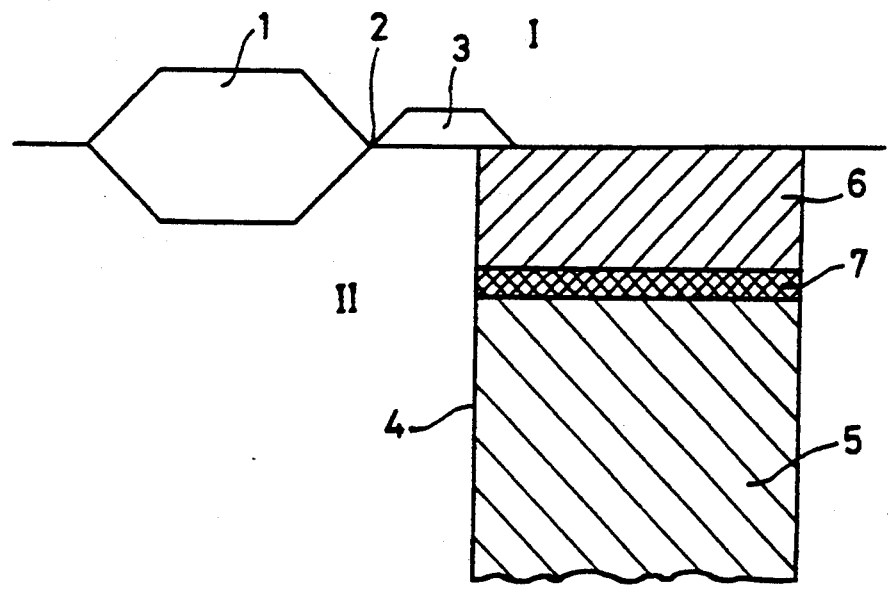

In FIG. 1, 1 indicates a mould cavity, 2 a gate, 3 an injection channel and 4 a displacement chamber. I and II show, diagrammatically, two mould halves. A plunger 5, shown diagrammatically, and a pill 6, in this case composed of a thermosetting plastic, are located in the displacement chamber 4. By way of example, a pressing auxiliary consisting of a polyester, in this case polyethylene terephthalate, is incorporated here between the pill and the plunger. The manner in which the pressing auxiliary is present in the displacement chamber 4 is not very critical in this case. It would also be possible to supply several small pills. It will be obvious that the displacement chamber 4 can be connected in a generally known manner with several mould cavities 1.

Figure 1B:
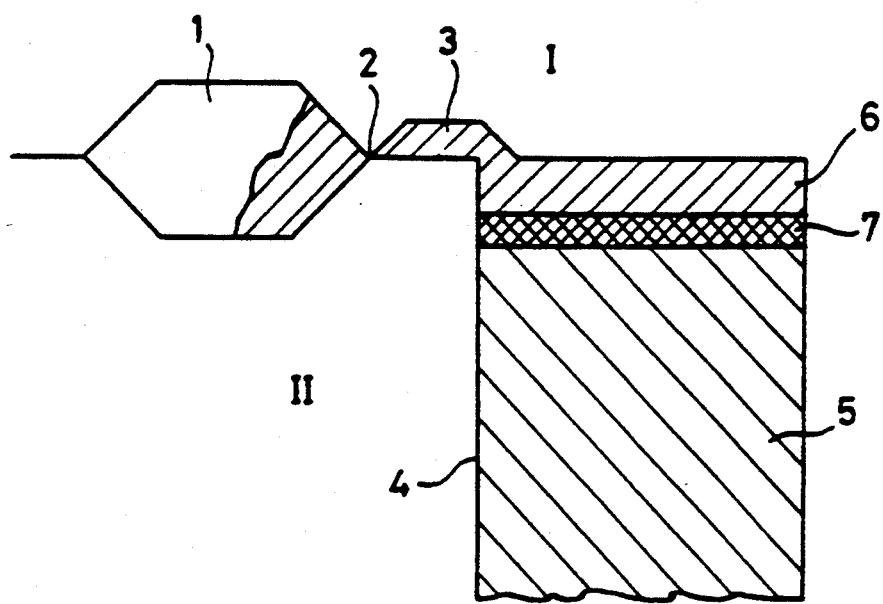

If the mould halves I and II are heated and the plunger 5 is pressed in the direction of the thermosetting plastic pill 6, the pill will melt at its top and bottom surfaces and will be pressed via the injection channel 3 and the gate 2 into the mould cavity 1, as shown stepwise in FIGS. 1b and c.

As a result of the rise in temperature, which originates both from the two mould halves I and II and from the heat of reaction of the curing reaction of the thermosetting plastic, the polyethylene terephthalate pill is softened and the latter can be pressed behind the thermosetting plastic into the injection channel 3, as is shown in FIG. 1d.

It is within the capacity of the average person skilled in the art to choose the amount of polyethylene terephthalate in such a way that this is just sufficient to fill the space in the injection channel 3 and the remaining space in the displacement chamber 4. The interface between the thermosetting plastic 6 and the pressing auxiliary 7 is, of course, preferably at the gate 2, or can also be somewhat upstream of this in the injection channel 3 or also somewhat downstream of this in the mould cavity 1. The particular conditions depend on the application concerned.

In the state shown in FIG. 1d, the mould cavity 1, which is filled with a thermosetting plastic 6, can be kept under pressure by the presence of the polyethylene terephthalate 7, so that bubble formation in the moulding is prevented. After curing and opening the mould I, II, the moulding can be broken off at the location of the gate 2 and the surplus residual material substantially consisting of polyethylene terephtalate can be re-used.

The use of the pressing auxiliary according to the invention also has the advantage that the unusable residual parts of the injection channels 3 and the displacement chamber 4 can easily be detached from the mould parts I, II.

It will be obvious that the method according to the invention can also be used in other fields where similar problems arise.

Figure 2:
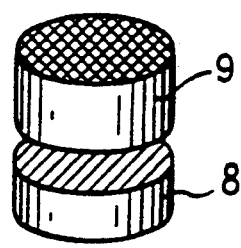
FIG. 2 shows an example of a plastic, which cures by means of a reaction, in pill form and the pressing auxiliary in pill form.

FIG. 2 shows a perspective view of a plastic, which cures by means of a reaction, in the form of a pill 9, as well as a pressing auxiliary 8 in pill form made of a material which is plastically deformable under pressing conditions and reversibly coagulates or hardens after pressing.

Figure 3:
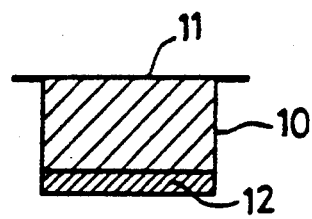
FIG. 3 shows a bowl-shaped holder made of pressing auxiliary which has a thickened base and is filled with a plastic which cures by means of a reaction.

FIG. 3 shows a diagrammatic cross-section of a bowl-shaped holder 10 which comprises a lid 11 and a thickened base 12 and is filled with a plastic 13 which cures by means of a reaction. The holder 10 can, for example, be placed under vacuum in order to prevent the intake of air or moisture. A filled holder 10 of this type can be placed in its entirety in a displacement chamber in order to be emptied by pressing, with breakage of the lid, into a mould cavity. When the holder 10 is empty, the holder material itself will also be pressed in order to fill the space between the mould cavity and the displacement chamber and thus to keep the mould cavity under pressure.

Figure 4:
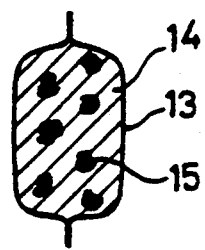
FIG. 4 shows a bag-shaped holder which is made of pressing auxiliary according to the invention and is filled with a plastic which cures by means of a reaction and pressing auxiliary granules according to the invention.

FIG. 4 shows a bag-shaped holder 13, which preferably consists of pressing auxiliary according to the invention and is filled with plastic 14, which cures by means of a reaction, and granules 15 of pressing auxiliary according to the invention.

Figure 5:
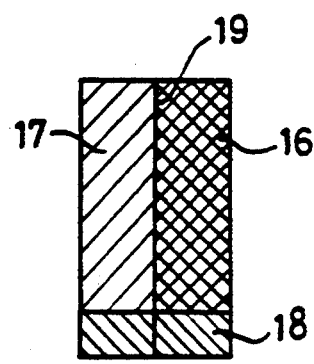
FIG. 5 shows an element which consists of two separate plastic components and an amount of pressing auxiliary.

Finally, FIG. 5 shows, diagrammatically, a two-component plastic element which has two compartments 16 and 17, which contain two components as well as an amount of pressing auxiliary 18 according to the invention. The two compartments 16 and 17 are separated by a breakable partition 19. When pressure is applied in the displacement chamber on the side of the pressing auxiliary 18, the partition 19 will be broken and the two components will come into contact with one another and be pressed into the mould cavity, where the curing reaction takes place.

I claim:

1. A method of pressing a plastic, which cures by means of a reaction, from a displacement chamber through an injection channel and a gate into a mold cavity and comprising the steps of positioning a plastic to be pressed and a pressing auxiliary in a displacement chamber, pressurizing the pressing auxiliary and the plastic and pressing the plastic into the mold cavity, allowing the plastic in the mold cavity to cure while under pressure, the quantity of the pressing auxiliary in the displacement chamber being sufficient to be pressed to the vicinity of the gate of the mold cavity, the pressing auxiliary comprising a material which is plastically deformable under conditions of the pressing and reversibly coagulates or hardens after pressing.

2. Method according to claim 1, wherein under the conditions of pressing, the pressing auxiliary has a higher viscosity than the plastic which cures by means of a reaction.

3. Method according to claim 1, wherein said pressing auxiliary is a thermoplastic.

4. Method according to claim 1, wherein said pressing auxiliary is pressed in pill form in the displacement chamber.

5. Method according to claim 1, wherein said pressing auxiliary comprises a holder for the plastic which cures by means of a reaction, such that the holder can be processed after filling with said plastic.

6. A pressing auxiliary in pill form, made of a material which is being plastically deformable under conditions of pressing and reversibly coagulates or hardens after pressing for use in a method of pressing a plastic, which cures by means of a reaction, from a displacement chamber through an injection channel and a gate into a mold cavity and comprises the steps of positioning a plastic to be pressed and a pressing auxiliary in a displacement chamber, pressurizing the pressing auxiliary and the plastic and pressing the plastic into the mold cavity, allowing the plastic in the mold cavity to cure while under pressure, the quantity of the pressing auxiliary in the displacement chamber being sufficient to be pressed to the vicinity of the gate of the mold cavity.

7. A holder made of a pressing auxiliary material being plastically deformable under conditions of pressing and reversibly coagulates or hardens after pressing, filled with a plastic which cures by means of a reaction for use in a method of pressing a plastic, which cures by means of a reaction, from a displacement chamber through an injection channel and a gate into a mold cavity and comprises the steps of positioning a plastic to be pressed and a pressing auxiliary in a displacement chamber, pressurizing the pressing auxiliary and the plastic and pressing the plastic into the mold cavity, allowing the plastic in the mold cavity to cure while under pressure, the quantity of the pressing auxiliary in the displacement chamber being sufficient to be pressed to the vicinity of the gate of the mold cavity.

* * * * *